United States Patent
Swiatek (10) Patent No.: US 7,198,512 B1
(45) Date of Patent: Apr. 3, 2007

(54) POWER DISTRIBUTION FOR LUGGAGE

(76) Inventor: John A. Swiatek, 46208 Meadowview Dr., Utica, MI (US) 48317

( * ) Notice: Subject to any disclaimer, the term of this patent is extended or adjusted under 35 U.S.C. 154(b) by 0 days.

(21) Appl. No.: 10/974,203

(22) Filed: Oct. 27, 2004

Related U.S. Application Data (60) Provisional application No. 60/514,755, filed on Oct. 27, 2003.

(51) Int. Cl.
*H01R 13/72* (2006.01)
(52) U.S. Cl. .................. 439/501; 439/528; 224/902
(58) Field of Classification Search ............... 439/501, 439/528, 40, 577, 34, 668, 677; 224/902, 224/929
See application file for complete search history.

(56) References Cited

U.S. PATENT DOCUMENTS

| | | | |
|---|---|---|---|
| 3,896,364 A | * | 7/1975 | Reister ................ 320/103 |
| 4,647,139 A | | 3/1987 | Yang |
| 4,759,190 A | * | 7/1988 | Trachtenberg et al. ....... 62/3.62 |
| 5,551,616 A | * | 9/1996 | Stitt et al. .................... 224/275 |
| 5,599,204 A | * | 2/1997 | Glassford ................... 439/502 |
| 5,961,207 A | | 10/1999 | Petkovic |
| 6,026,646 A | * | 2/2000 | Hansen et al. ................ 62/3.6 |
| 6,343,949 B1 | * | 2/2002 | Floyd .......................... 439/504 |
| 6,527,585 B1 | * | 3/2003 | Pannone ...................... 439/504 |
| 7,033,209 B2 | * | 4/2006 | Swiatek et al. ............. 439/502 |

* cited by examiner

*Primary Examiner*—X. Chung-Trans (57) ABSTRACT

Vehicular luggage having power components therein, especially for motorcycle and snowmobile tank bags, tail packs and saddle bags. Each piece of luggage includes power supplies and electrical connectors therein, including cigar sockets, SAE connectors and DIN 4165 connectors. Further aspects include using flexible printed circuit boards as electrical connectors, and substituting them for wall stiffeners on the luggage. Such powered luggage may include internal and external lights, electrical connectors for charging electronic appliances, such as cell phones, radar detectors, GPS units, laptop computers, and the like. Another aspect includes a heating and cooling element and further electrical connections.

12 Claims, 8 Drawing Sheets

FIG 8

POWER DISTRIBUTION FOR LUGGAGE

CROSS REFERENCES TO RELATED APPLICATIONS

This application claims the benefit under 35 U.S.C. 119(e) of U.S. Provisional Application No. 60/514,755 filed on Oct. 27, 2003.

BACKGROUND OF THE INVENTION

1. Field of the Invention

The present invention relates to personal vehicle accessories, and more particularly, the invention relates to an electrically powered motorcycle tank bag.

2. Description of the Prior Art

Sport vehicle enthusiasts have been adding more and more accessories to their vehicles as the years go by. This even includes things such as plug-in vests to keep the enthusiasts warm, in addition to radios, cell phones, radar detectors, and the like. However, there has been a longstanding problem with using these appliances and accessories in that there are no quick and easy electrical connections to the battery or motor when they are operating.

Recently, motorcycle riding has become much more popular, especially for executives. These executives use a fair number of electronic and communication devices for "keeping in touch", and those devices all require electrical charging. As there aren't any standard connections for such devices, the present invention has various aspects for accommodating the electrical connectivities needed.

One very popular motorcycle accessory is a tank bag. This bag sits on the gas tank, and is used to hold anything the driver wants. Therefore, it would be an advantage to a motorcycle enthusiast to have at his disposal a series of various electrical plugs, accessory outlets, and the like for plugging in all of his appliances and accessories. It would also be advantageous to have standard sized outlets and plugs such that connectors may be used for a host of appliances and accessories.

SUMMARY OF THE INVENTION

Although the present invention will be described mostly in the context of a motorcycle tank bag, it is envisioned by the present inventor that these outlets and plugs may be utilized in any application, such as on motorcycles, boats, jet skis, wheelchairs, planes, gliders, moving medical devices, snowmobiles and the like, and especially for those electrical appliances which need to be recharged during a long trip, such as cell phones, radar detectors, and the like. All the embodiments may utilize bags, baskets, or any other luggage applications such as tank bags, zippered enclosed tank bags, tail packs, saddle bags, hood bags, wheelchair baskets, plane cabin packs, combinations thereof, and the like. However, small electrical appliances would also work with certain adaptations such as laptop computers, DVD players, TV's, etc. Therefore, in an attempt to achieve these advantages and objects as described hereinabove, the present invention, described as follows, provides aspects that are advantageous and desired by motorcyclists.

This document covers the various functional implementations for power connection, wire management, power distribution and related electronic accessories in a piece of vehicle luggage for powering electronic devices. A "tank bag" is shown in the drawings for illustrative purposes but any vehicle luggage, whether it is hard or soft, would benefit from the invention. Electrically, one embodiment of the present invention uses, among other electrical connectors, flexible printed circuit boards and interconnecting wires to provide the power connections between the main power input and the multiple power outputs, switches and other electronic devices. The connectors are comprised of, but not limited to, cigarette sockets, DIN 4165 connectors, and SAE connectors. Mechanically, a flexible PC board also provides the stiffening useful in current tank bag designs. This invention may be used on all vehicles that use a storage bag. This includes, but is not limited to, automobiles, motorcycles, 4-wheelers, jet skis, wheelchairs, planes, gliders, moving medical devices, and snowmobiles, among others.

In one aspect of the present invention, a printed circuit board may be utilized as the electrical connector for placement within a piece of luggage, preferably a tank bag, and this printed circuit board provides a low cost, easy to install during manufacture, readily adaptable for different models of individual tank bag design, by replacing the conventional stiffeners with the flexible printed circuit board.

In addition, in other aspects of the present invention, there are electrical wire connectors which extend in and around the interior walls of the luggage or tank bag, that may be glued to a flexible piece of plastic, or other suitable material.

Further aspects of the present invention allow electrical connections to be made inside and outside the luggage or tank bag. Preferably, commonly utilized electrical connectors, such as cigarette-type sockets, may be mounted on the front inside the bag that could be used to power commonly used electronic devices such as GPS and radar detectors.

The present designs alleviate the need to run wires through zippered areas in the luggage or tank bags. It also minimizes excess wiring inside the tank bag, thereby alleviating clutter and providing more space inside the luggage or tank bag for the items to be stored. Safe operation of the vehicle is provided because the wires that may be utilized to power electronic devices will not become tangled, thereby preventing handlebars from turning, as the electrical connectors are all self-contained within the tank bag.

Anything that is stored in the tank bag, including electronic accessories, may be provided power through the inner connection of the tank bag and the power supplied by the vehicle electrical system. This provides a clean appearance, and is visually pleasing to the operator.

Although the invention will be described by way of examples hereinbelow for specific embodiments having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different embodiments and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various embodiments of the present invention, reference shall be made to the following detailed description, and when taken in conjunction with the accompanying drawings, in which like parts are given the same reference numerals, and wherein.

DETAILED DESCRIPTION OF THE INVENTION

Again, as discussed hereinabove, the present invention will be described predominantly with reference to a motorcycle tank bag, although the inventor contemplates that this invention is equally applicable to any luggage configuration that is in close proximity to a power source. This may occur, for instance, on snowmobiles, ATV's, boats, jet skis, wheelchairs, planes, gliders, moving medical devices, or any other vehicle. Bearing this in mind, we will now describe the invention in the context of the motorcycle tank bag.

Further, all the below discussed embodiments have one thing in common, that being the fact there is an electrical connection between the luggage and the main power source of the vehicle on which the luggage is being carried. Basically, there are two methods for achieving electrical communication between the luggage and the power source, i.e. that being a first method of plugging the luggage into the one of the socket connectors described in my previous patent application, detailed above; or a second method of hard wiring the electrical communication into the vehicle battery with a fused harness.

To achieve electrical communication with the power supply of the vehicle, a wiring harness with an attached connector, preferably including a two-pin SAE connector, including a male terminal and a female terminal, may be connected to a vehicle battery. Optionally, a switched ignition module may be put in line with a switched ignition input and attached to a vehicle by using, for example, a one-quarter inch spade terminal attached thereto for placement and securement within the vehicle. A wire terminating in a ground fork terminal may extend to the power supply, which another wire may extend from an ignition module to an optional fuse holder with a fuse therein. The fuse may be a replaceable fuse and/or an environmental fuse holder, preferably a conventional ATO or mini-ATO, in the range of from about 3 to about 20 amps, and most preferably would include a weatherproof fuse holder with an ATO 7.5 amp fuse installed therein. Preferably, yet another wire would extend from the fuse holder to terminate in a battery positive fork terminal, which would then be attached to the battery of the vehicle.

In the preferred connection embodiment, the wiring harness may be made of any suitable wire configuration, although it preferably is a single conductor PVC coated wire, or a two conductor zip cord, preferably in the range of 18 awg to about 12 awg with a preferred temperature rating of from $80c$ to $125c$, and most preferably made of one black and one red wire, of a 16-guage, 105$c$, PVC covered wiring harness. Such a wiring harness may also further include a second protective sheathing that also provides a bundling function, and is also preferably wrapped in electrical tape or bound with PVC or another similar tubing, and is most preferably sheathed over with a 105$c$ PVC tubing. Although the ground fork and battery positive fork terminals are preferably one-quarter inch spade connectors, any suitable connector may be utilized, depending upon the application. In practicing the present invention, one would select whatever type of electrical termination connector would be best suited for the application at hand. Throughout the description of the present invention, there will be wires, such as cabling or wiring harnesses, used throughout and those wires may be any suitable wire and may be of any particular amperage which is suitable, although the preferred ranges and materials used are described hereinabove. The wires may be solid core, braided core, stranded wire, or any other suitable wire material.

At the end of the wiring harness would be terminals or connectors which are suitable for all the embodiments of the present invention, including insulated or non-insulated terminals, and they may be optionally color-coded for easy polarity determinations, or they may be marked in any sort of fashion. In fact, all of the terminals and sockets may be color coded to closely correspond to the black and red color codes traditionally used in the electrical and electronics fields. It is especially preferable to mark the two-pin SAE connectors which are used throughout the present invention by using a red dot for the positive side, whether inscribed into the plastic on the positive terminal of the SAE connector, or a raised plus sign, or an indentation, possibly having some coloring in order for easy polarity determination. For instance, an off-road vehicle enthusiast may wish to plug in a heated vest in the darkness in order to get warm. If there were no lights around, the enthusiast may be able to feel for a raised plus sign, or for an indentation on the positive terminal, in order to be able to correctly plug in his vest without needing light to determine which was the positive and negative terminals. At the terminal end of the wire and connector, the terminals which are preferably used to connect the cable or wiring harness to the battery or other power source are preferably No. 8 to three-eighths of an inch ring or fork terminals, and most preferably are made of non-insulated quarter-inch fork terminals covered in red and black shrink tubing to provide insulation and color coding. It is well known in the electrical field that red is the color representing positive terminals, while black represents ground, or negative electrical current.

Consequently, it must be noted by the reader that the following embodiments will all be connected to the main power supply of the vehicle by some means, preferably by those means described above. With that in mind, we now turn to the actual powered luggage of the present invention.

1. Luggage with an Integrated Power Connector

Figure 1:
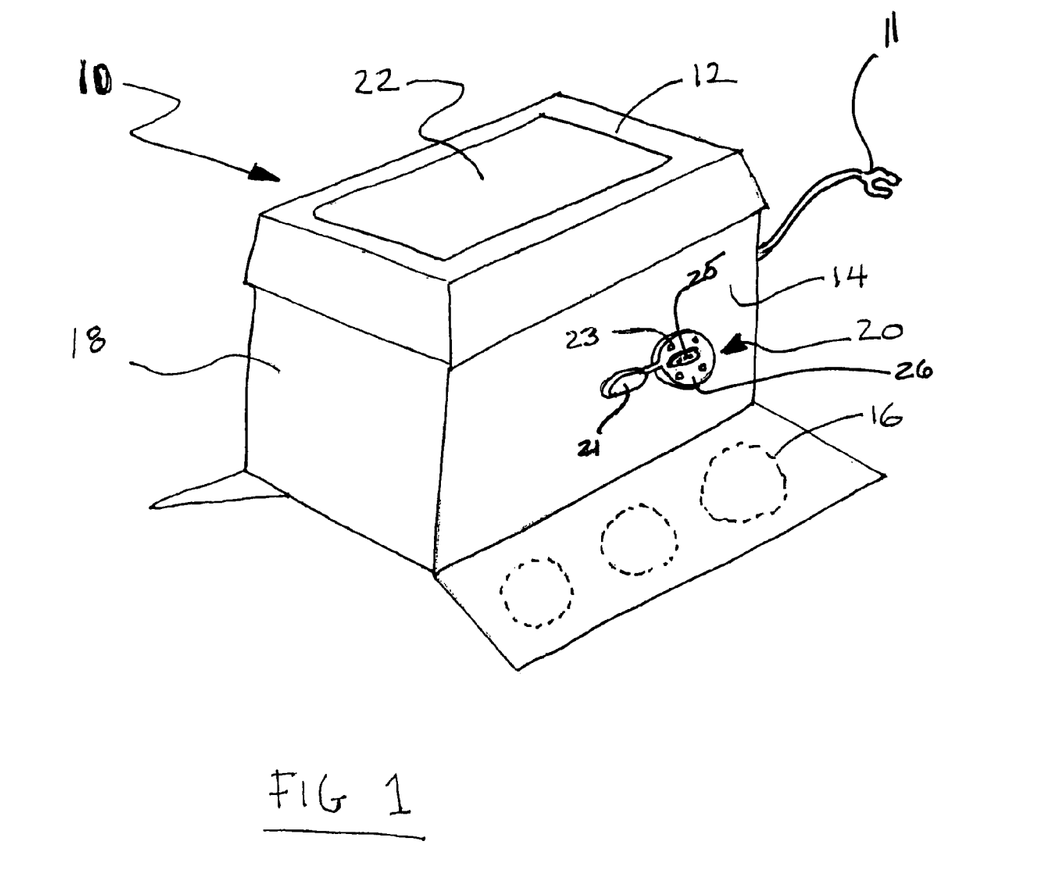
FIG. 1 is a front perspective view of a piece of motorcycle tank bag luggage made in accordance with the present invention.

Looking first to FIG. 1, there is shown a first aspect of the present invention, specifically a motorcycle tank bag generally denoted by numeral 10, including a tank bag top 12 and tank bag sides and front, 14 and 18 respectively, along with a power supply cord 11 extending therefrom for connection to the main power supply of the vehicle. Conventional means, such as tie downs, may be utilized to attach the luggage to the gas tank of the vehicle, although any other type of tie down may be utilized, including magnets 16. Tank bag front 18 generally is preferably oriented toward the rider of the vehicle, not the front of the motorcycle. Many tank bags may also include an optional clear map pocket 22. The present invention shows a power outlet, generally denoted by the numeral 20, in accordance with the present invention. Power outlet 20 preferably extends through tank bag side 14, although it may be located in any part of the tank bag itself. In this configuration, a power connector socket 25 is situated on a faceplate 26 that is secured by fasteners 23. Power connector socket 25 may be any type of socket, including a 12-Volt cigarette lighter type socket, a DIN 4165 connector or an SAE connector, among others. Such a socket is secured within faceplate 26 to provide a rigid connection for any appliance that is connected thereto. Faceplate 26 may be protected by an optional cover 21 to protect the power socket from rain, dust and dirt. Fasteners 23 may be any conventional fastener, but is preferably a rivet or screw.

2. Luggage with Interior Connectors

Figure 2:
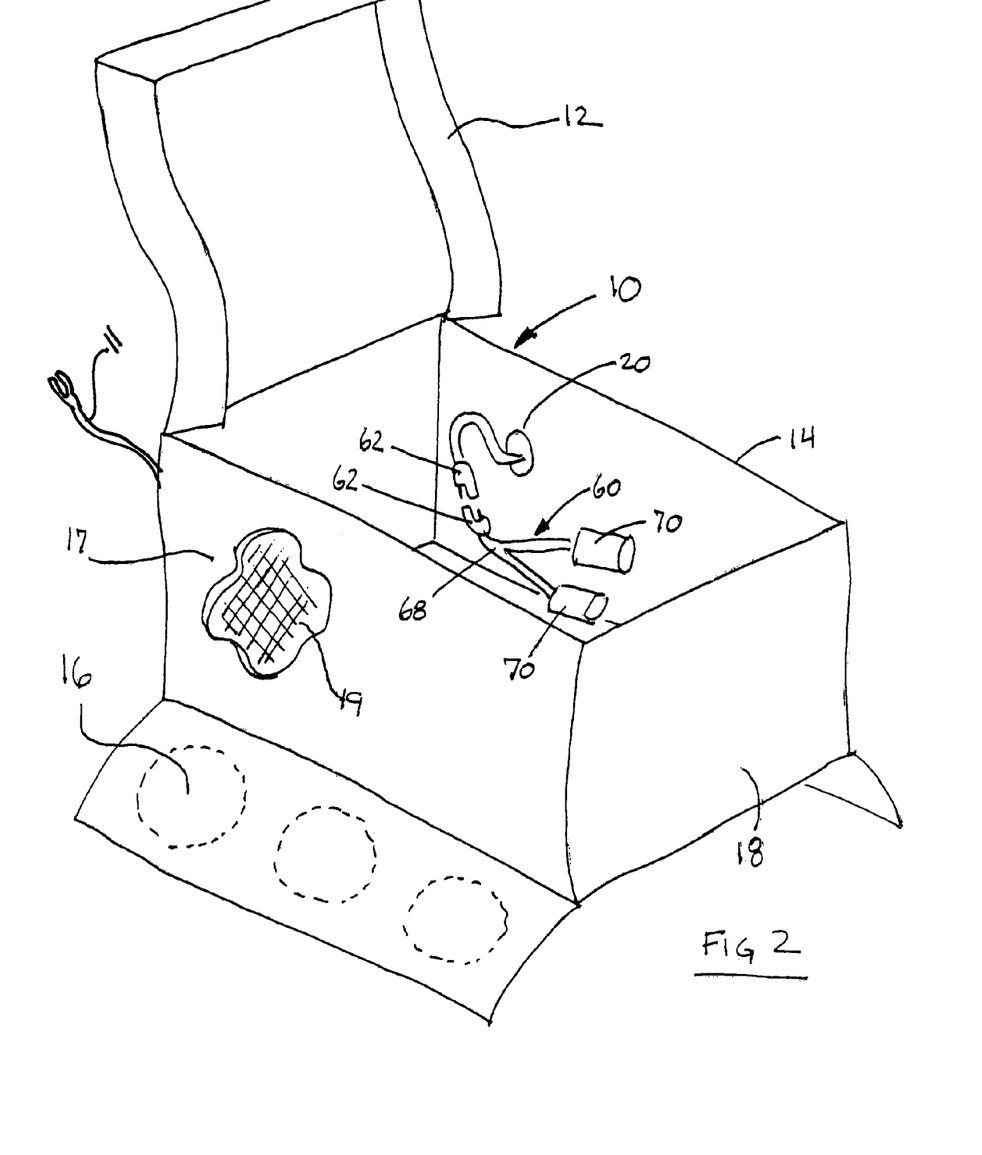
FIG. 2 illustrates an aspect of the present invention detailing the electrical connections.

Looking next to FIG. 2, there is shown an interior view of a second embodiment of the present invention wherein two cigarette sockets 70 are provided inside tank bag 10. Such cigarette lighter type sockets are popular, as they may be universally used for 12-Volt chargers for cell phones, laptop computers, radar detectors, and other normal appliances. Power outlet 20 has a wire attached thereto as shown in FIG. 1, although in this embodiment, said wire is connected to a two pin SAE connector 62. Although the wire may be split directly and attached to two cigarette sockets 70, in this embodiment shown there is a second adapter generally denoted by the numeral 60 which includes an SAE complementary connector 62 splitting the power between two wires 68 attached to cigarette socket 70. This configuration and method is disclosed in co-owned PCT International Patent Application No. PCT/US2003/000318, which in incorporated herein in its entirety.

Conventional tank bag designs utilize some form of semi-rigid stiffener 19, shown in the interior of the cutaway portion of exterior fabric 17. The stiffener 19 is used to provide mechanical support to keep the shape of the tank bag in the upright position.

3. Luggage Utilizing a Flexible Printed Circuit Board (PCB)

Figure 3:
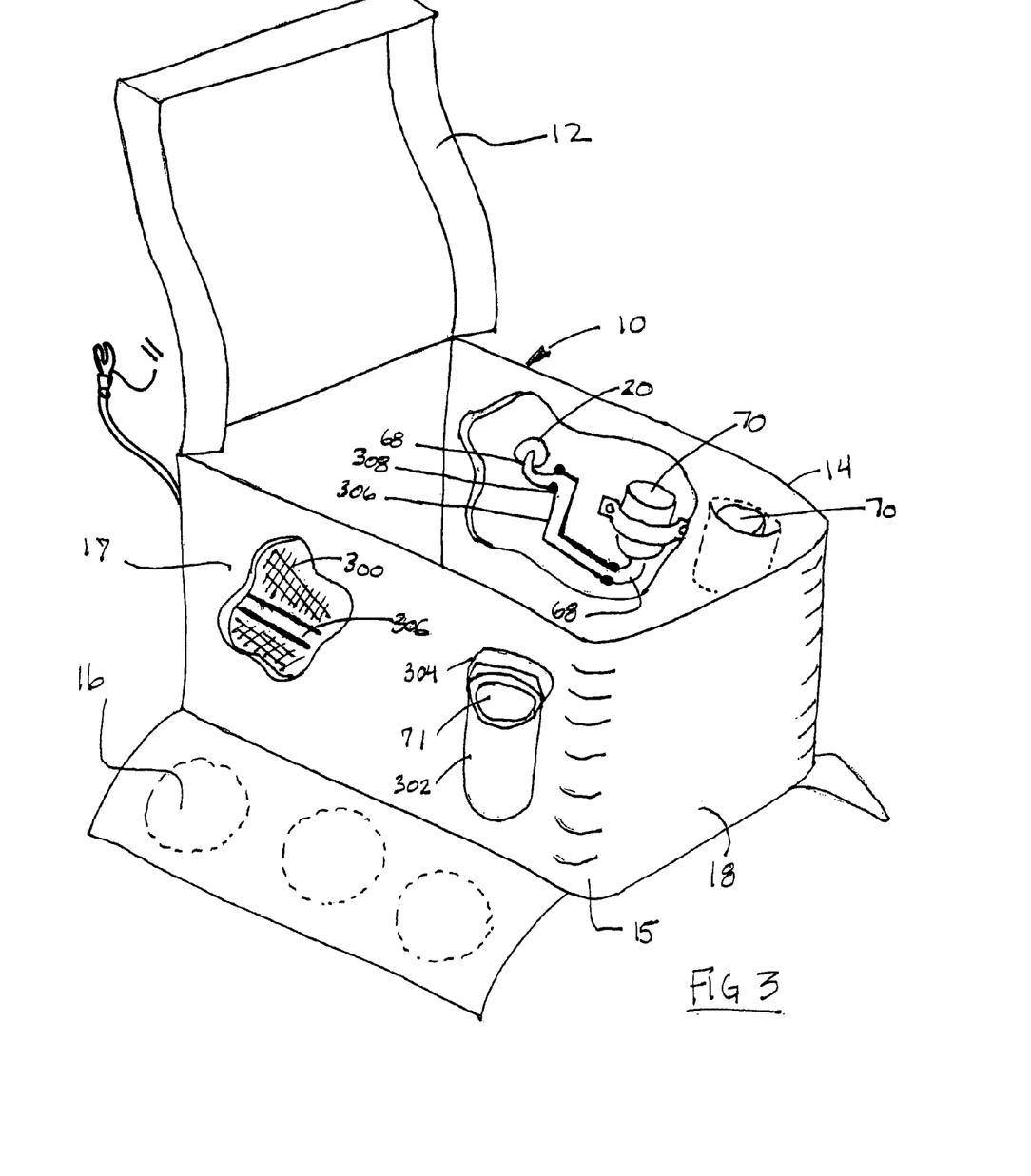
FIG. 3 is a cutaway perspective view of another aspect of the present invention.

FIG. 3 shows yet a further embodiment to provide a similar type of power distribution as that illustrated for the embodiment shown in FIG. 2. In this embodiment, however, power is transferred from the input power connector 20 to output power connectors 70 using a flexible printed circuit board (hereinafter "PCB") 300 (shown in the cutaway on the outside wall 17 of the tank bag) which can bend around the corners of the tank bag body 15 preferably by using bonded or un-bonded conductors 306. This embodiment discloses both internal connectors 70 and external connectors 71 which can be optionally housed in a pouch 302 and covered with a lid 304. Again, any variety of connector can be used, including those described hereinabove. Providing two connectors on the rear of the bag would be ideal for powering multiple devices, for instance, simultaneous use of radar detectors and GPS units. The advantage of sockets mounted on the rear of the tank bag is safety, as the power cords would not interfere with the turning of the vehicle.

Looking still to FIG. 3, interconnecting wires 68 are shown as soldered to the PCB 300, preferably using conventional solder pads 308, although any soldering means may be employed. The connectors 70 and 71 can be attached to the PCB using a variety of common methods, including directly soldering the connector to the PCB pads 308 eliminating the need for the interconnecting wires 68. The hidden flexible printed circuit board PCB 300 also provides mechanical stiffening needed to keep the wall of the tank bag semi-rigid for enabling the tank bag to remain in an upright position by itself. By replacing the conventional stiffener 19 with a flexible PCB 300, several advantages are realized, including, but not limited to, reduced tank bag manufacturing cost and elimination of the cable clutter inside the tank bag. Furthermore, flexible PCB 300 can be used to carry audio and data signals along with conventional power foils 306, providing a low cost means to distribute audio, data and power throughout the luggage. Power foils 306 are a standard means of electronic communication on printed circuit boards available in the industry.

4. Luggage with Flexible PCB as an Upright Wall Stiffener

Figure 4:
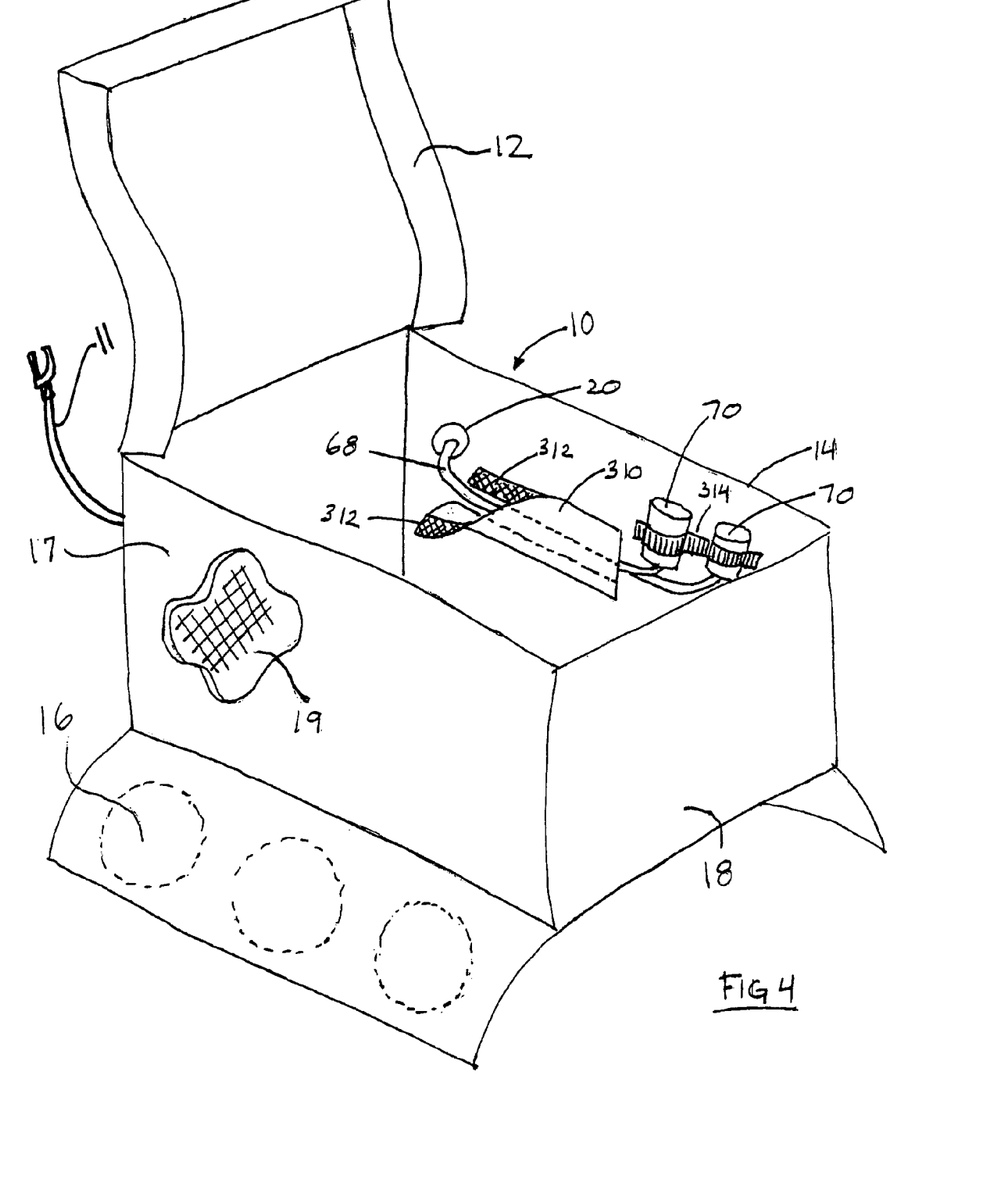
FIG. 4 is another aspect of the present invention, illustrating the use of individual wires.

FIG. 4 shows yet another embodiment of the present invention where the interconnecting wiring 68 and connectors 70 can be enclosed and held in place. In this embodiment, the drawing illustrates the use of flaps 310 to cover the wiring and with a separate elastic band 314 to secure the connectors to the interior upright wall of the tank bag. Any fastening means may be employed, but the preferred embodiment utilizes a hook-and-loop fastener 312 to fasten the flap 310 to the tank bag. As any form of fastening can be used, further embodiments may include the use of snaps and ties. Although an elastic band is shown, many fastening methods can be used to secure the socket to the side of the bag.

5. Luggage with Lighting Features (Combined Reference to FIGS. 5 and 6)

Figure 5:
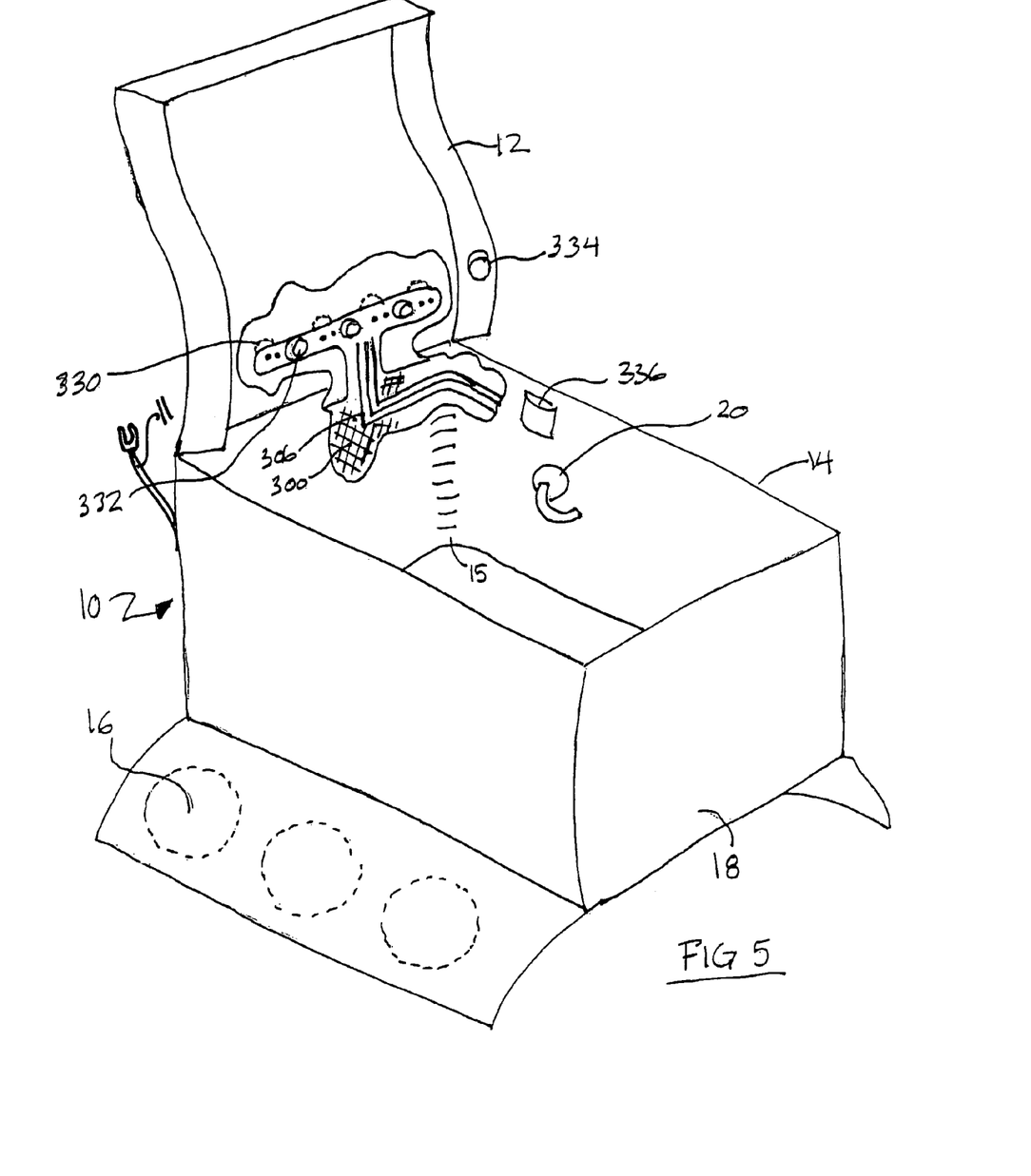
FIG. 5 is a perspective cutaway view of a tank bag utilizing the flexible printed circuit board.

Looking now to FIG. 5, distribution of power via a PCB 300 is shown to effectively light both the interior of the tank bag and exterior map pocket 22 of a tank bag. This lighting feature is activated by interior light(s) 332, which are preferably controlled by a switch 336, with a switch trigger 334. In this embodiment, interior light(s) 332 are shown in place electrically connected to the power supply of the vehicle. These lights may be activated by opening and closing the tank bag top 12 via switch trigger 334.

Figure 6:
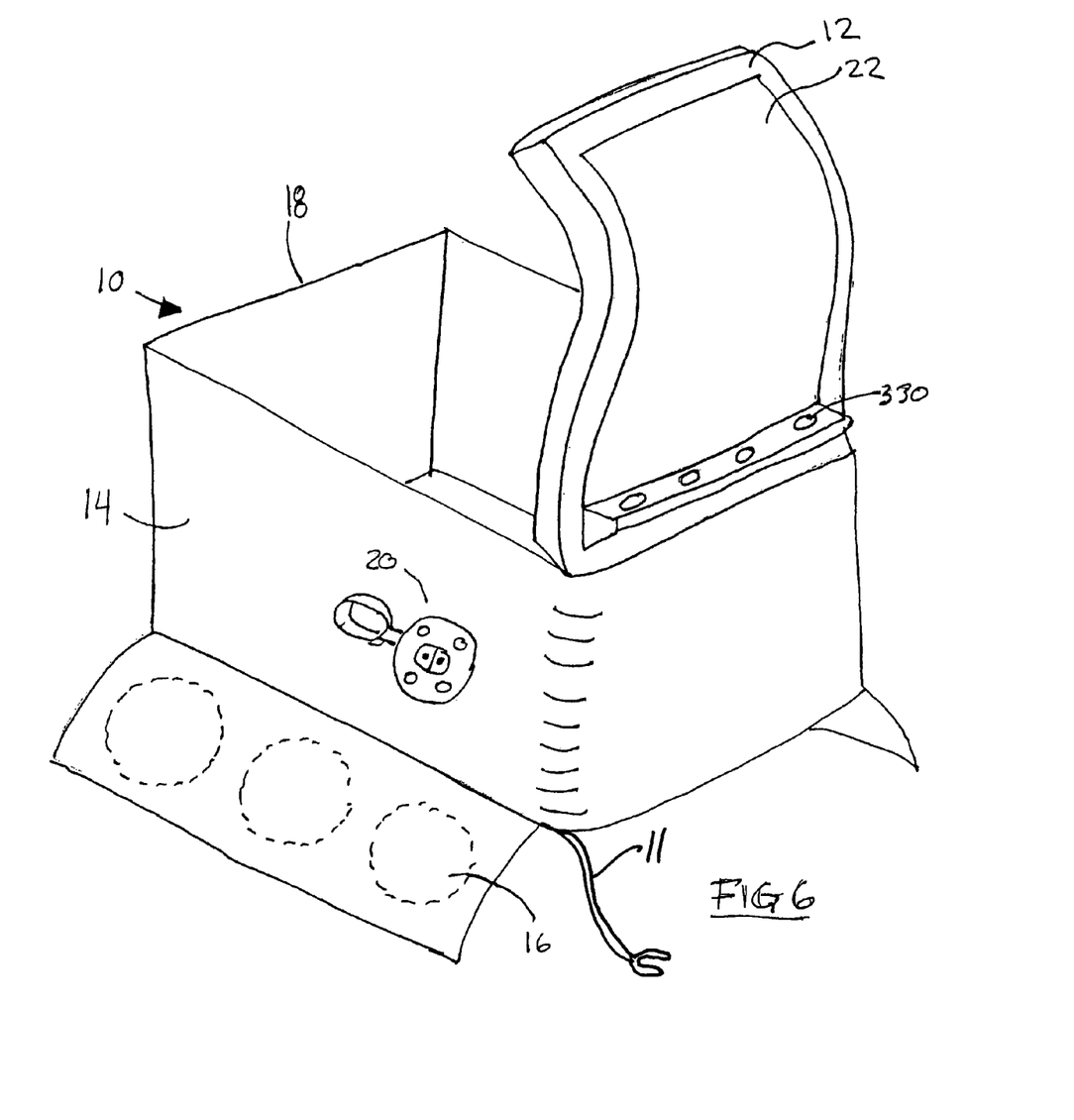
FIG. 6 is a perspective view of another aspect of the present invention utilizing interior and external lights.

FIG. 6 illustrates the preferred relative placement of external lights 330 as an option that can be used to illuminate a map that may be contained in map pocket 22 on the top of the tank bag 12 using the external lights 330. It is also envisioned by the present inventor that this map pocket may also be edge lit by coupling the light into the edge of the conventional clear plastic map pocket cover. A light-induced fluorescing plastic sheet may be used, such as that available from Feezey Productions, Inc., of West Bloomfield, Mich.

6. Luggage with Heating and Cooling Features

Figure 7:
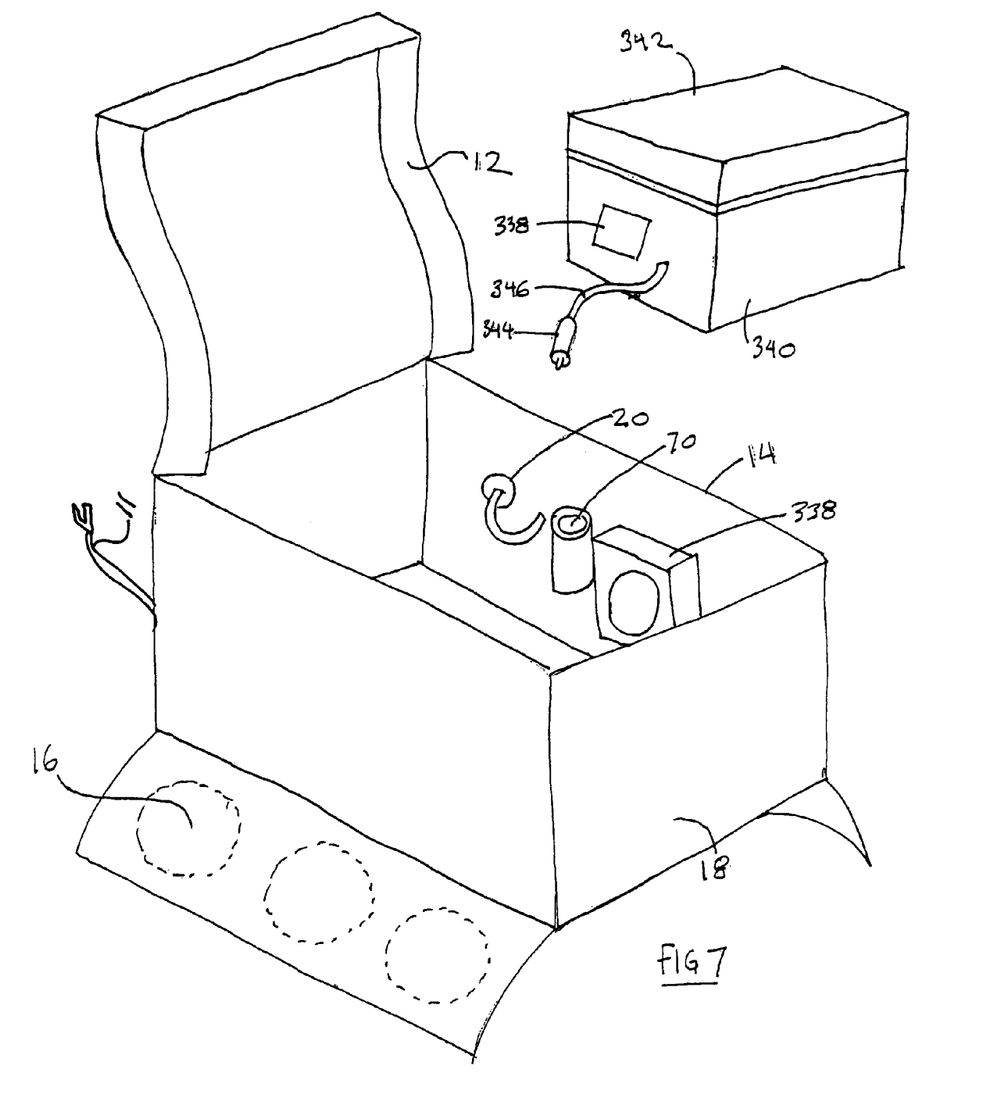
FIG. 7 is a perspective view of yet another aspect of the present invention, including a heating and cooling element.

FIG. 7 illustrates yet another embodiment of the present invention in which it shows the use of a 12-Volt thermoelectric heating and cooling element 338 that can be located directly in an insulated tank bag 10 or separately in an insulated tank bag liner/cooler 340. Conventional cooler 340, cooler element 338, cooler lid 342, cooler power cord 346 and cooler plug 344 are existing technology readily available for use in automobiles. Thermoelectric devices such as those available from Tellurex Corporation of Traverse City, Mich., are thin, flat, plate-like devices, having a dimension of about four (4) square inches. Such devices can cool or heat the area within the tank bag while utilizing a minimum of energy. The thermoelectric device receives electrical energy from the power supply of the vehicle, and converts the electricity into thermal energy to regulate the temperature of the contents of the tank bag.

7. Luggage with Safety Lighting Features

Figure 8:
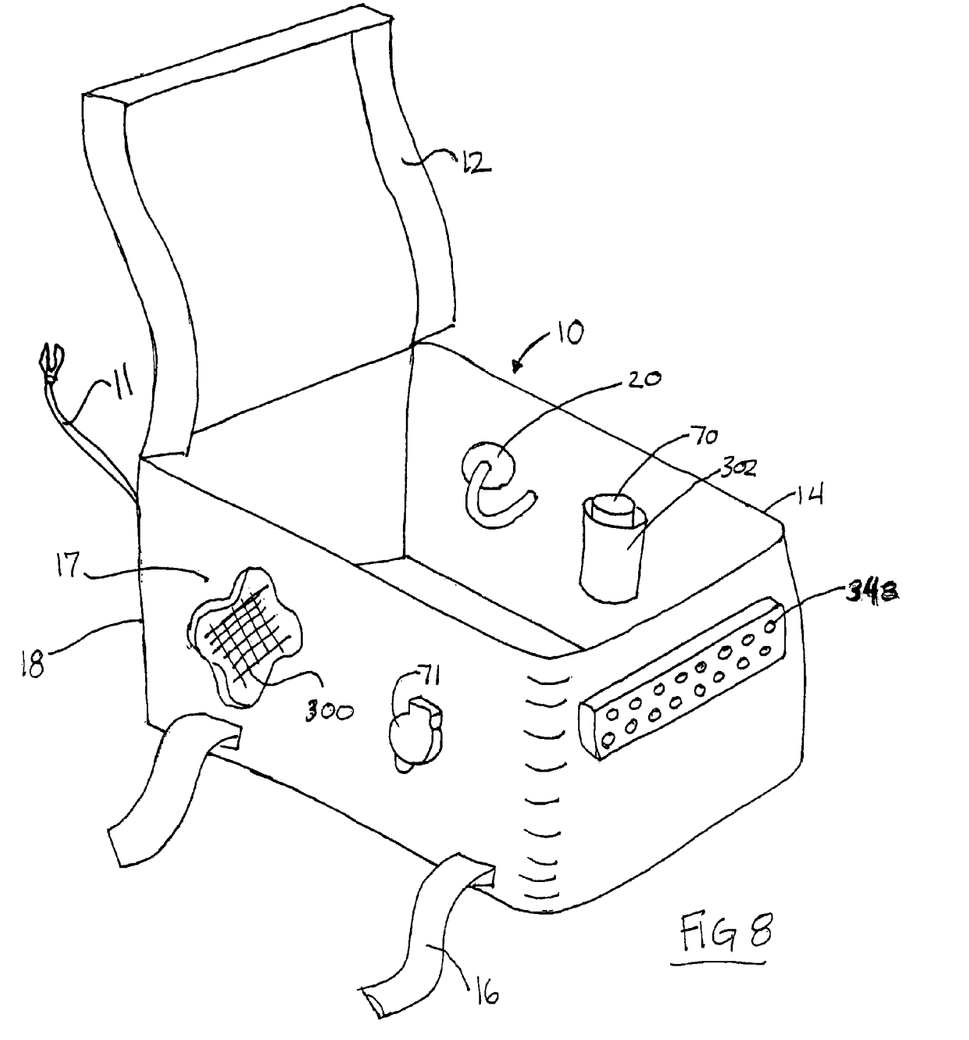
FIG. 8 is a perspective view of yet another aspect of the present invention illustrating the running lights and stop light configuration.

FIG. 8 illustrates yet another embodiment of the present invention for a tail pack style tank bag commonly used on motorcycles. The device of FIG. 8 includes tank bag 10, tank bag top 12, tank bag upright side wall 14 and tie downs 16. The front of the tank bag 18, or the portion facing the driver, is attached to the other upright walls of tank bag 10, and all the upright sides are stiffened with either a stiffening material or a flexible PCB. FIG. 8 shows the integration of a cigarette connector 70 with a safety light 348. In this embodiment of a tail pack, it may be advantageous to provide an external stop light and running light 348 that operates similar to a conventional running light that acts as a stop light when the brakes are applied. This is made possible by incorporating the running light 348 into a tail pack 10 using a flexible PCB 300 with a power input connector 20. Tail packs are luggage specifically designed for the back of a small vehicle such as a motorcycle. They are very similar in construction to a tank bag. In this case, however, a three conductor input power connector 20 would be necessary to provide electricity to active running/stop light 348. This three component system preferably comprises an internal cigarette socket 70 with an external connector 71 in electrical communication with a stop/running light. It is believed that this would also be very useful in different types of pieces of luggage called saddle bags, and top cases, along with any other piece of vehicle luggage.

Even though the above-described embodiments show individual aspects with regards to each Figure, it must be noted that all, or any combination, of the above electrical accessories shown in FIGS. 1 thru 8 can be implemented together in one piece of luggage.

In summary, numerous benefits have been described which result from employing any or all of the concepts and the features of the various specific aspects and embodiments of the present invention, or those that are within the scope of the invention. The foregoing description of various preferred embodiments of the invention have been presented for purposes of illustration and description. It is not intended to be exhaustive or to limit the invention to the precise form disclosed. Obvious modifications or variations are possible in light of the above teachings with regards to the specific embodiments. The embodiment was chosen and described in order to best illustrate the principles of the invention and its practical applications to thereby enable one of ordinary skill in the art to best utilize the invention in various embodiments and with various modifications as are suited to the particular use contemplated. It is intended that the scope of the invention be defined by the claims which are appended hereto.

What is claimed is:

1. A sport vehicle luggage device to power and recharge electric appliances in an outdoor environment from a vehicle having a battery, comprising:
   a luggage enclosure for use on a sport vehicle, said luggage enclosure having a walled enclosure;
   an electrical power supply including a flexible printed circuit board incorporated into the luggage enclosure to provide mechanical stiffening to keep the wall semi-rigid to enable the luggage to remain in an upright position by itself, said flexible printed circuit board being adapted to be in electrical communication with the vehicle battery; and
   at least one electrical connector attached to the luggage enclosure, wherein said electrical connector is also in electrical communication with the flexible circuit board, said electrical connector being selected from the group consisting of cigarette-type socket connectors, SAE connectors, DIN 4165 connectors, and combinations thereof, wherein said at least one electrical connector is utilized for electrically powering and recharging the various electric appliances.

2. The luggage device of claim 1, wherein said luggage enclosure is selected from the group consisting of motorcycle tank bags, motorcycle tail packs, motorcycle saddle bags, snowmobile hood bags, wheelchair baskets, jet ski luggage, plane cabin packs, and combinations thereof.

3. The luggage device of claim 1, further comprising stop and running lights in electrical communication with the luggage device for providing lighting from the rear of the vehicle.

4. The luggage device of claim 1, further comprising map lights coupling into the top edge of the luggage disclosure.

5. The luggage device of claim 1, further comprising a heating and cooling element in the luggage device for regulating the temperature of the interior of the luggage.

6. The luggage device of claim 1, further comprising a power foil attached to the flexible printed circuit board, wherein said power foil distributes audio and data signals throughout the luggage enclosure.

7. A sport vehicle luggage device to power various electric power consuming appliances in an outdoor environment from a vehicle having a battery, comprising:
   a luggage enclosure selected from the group consisting of motorcycle tank bags, motorcycle tail packs, motorcycle saddle bags, snowmobile hood bags, wheelchair baskets, jet ski luggage, plane cabin packs, and combinations thereof;
   an electrical power supply including a wire extending to the vehicle battery
   a flexible printed circuit board incorporated into the luggage enclosure and adapted to be in electrical communication with the power supply, wherein said flexible printed circuit board provides mechanical stiffening for the luggage enclosure; and
   wherein said flexible printed circuit board is electrically attached to at least one electrical connector utilized for electrically communicating with the various electric appliances, said at least one electrical connector being adapted for accommodating different electrical connections from the various electric power consuming appliances.

8. The luggage device of claim 7, wherein said luggage enclosure is a zippered enclosed motorcycle tank bag.

9. The luggage device of claim 7, further comprising stop and running lights in electrical communication with the luggage device for providing lighting from the rear of the vehicle.

10. The luggage device of claim 7, further comprising map lights coupling into the top edge of the luggage device, said map lights being used to illuminate a map that is contained in a map pocket on top of the luggage enclosure.

11. The luggage device of claim 7, further comprising a heating and cooling element in the luggage device for regulating the temperature of the interior of the luggage.

12. A motorcycle tank bag to power electric appliances in an outdoor environment from a motorcycle having a battery, comprising:
   a tank bag enclosure;
   an electrical power supply including a wire extending to the motorcycle battery;

a hidden flexible printed circuit board embedded into the tank bag enclosure and adapted to be in electrical communication with the power supply, wherein said flexible printed circuit board provides mechanical stiffening for the tank bag enclosure;

a power foil attached to the flexible printed circuit board, wherein said power foil distributes audio and data signals throughout the tank bag enclosure; and wherein said flexible printed circuit board is electrically attached to at least one electrical connector utilized for electrically communicating with the electric appliances, said at least one electrical connector being adapted for accommodating different electrical connections from power consuming appliances.

* * * * *